May 6, 1969     F. FRENKEL     3,442,017

SAMPLING LIQUID LEVEL MEASURING DEVICE

Filed July 28, 1967

INVENTOR.
FRANCIS FRENKEL
BY Bernard M. Smukler
ATTORNEY

3,442,017
SAMPLING LIQUID LEVEL MEASURING DEVICE
Francis Frenkel, Los Angeles, Calif., assignor to American Liquid Instruments, Inc., a corporation of California
Filed July 28, 1967, Ser. No. 656,847
Int. Cl. G01f 23/04
U.S. Cl. 33—126.4          4 Claims

ABSTRACT OF THE DISCLOSURE

A liquid level indicator for determining the quantity and relative location of various liquids present within a tank. The indicator includes a transparent tube for viewing the quantity and relative location of the various liquids after a valve positioned at the end of the transparent tube is closed and the indicator is brought to the surface. A jacket having a scale and two vertical and parallel rows of slots so that the height of any liquid within the tube may be directly observed any place along the tube.

---

This invention relates in general to liquid level indicators, and more particularly to such indicators which assist the user in determining the quantity and relative location of the various liquids which may be present within a storage tank, drum or similar container means.

In the petroleum and chemical industries, among others, it is frequently necessary to determine the depth of the liquid pool contained within a storage tank, and to also determine the quantity of the various liquids, such as gasoline, oil or other fluids, found therein. Furthermore, it is also desirous to determine the relative location of such liquids so that they may be selectively drained off if necessary.

In order to meet such problems, the present invention, among other things, provides a simple valve device at one end of a hollow tubular member, which device cannot interfere with an accurate reading of the height of the liquid pool, even for very small quantities, and which insures a proper reading of the quantity of any pool of liquid contained within a storage tank.

With the foregoing in mind, it is the primary object of the present invention to provide a liquid level indicator whch is substantially unaffected by the various types of liquids and petroleum products, and which assists the user thereof in determining the quantity and relative location of each of the liquids which may be contained within a storage tank or drum.

An additional object of the present invention is to provide a liquid level device as described above, which assists the user thereof in determining the kind of liquid or liquids found within said storage tank.

A further object of the present invention is to provide a unique valve at the lowermost portion of said device, which insures complete closure of the liquid contained within said device upon contact with the bottom of said storage tank, but which can be easily manipulated so that any liquid contained within said device may be quickly discharged therefrom.

Further and additional objects and advantages of the present invention include having a liquid level device with an engraved scale thereon adapted to indicate the height and quantity of the various liquids contained within a storage tank or similar container means; to enable the user thereof to measure and/or view the liquid within said device at any height whatsoever by providing said scale and alternating slots along the entire length thereof; and to have said invention be of maximum simplicity and efficiency in accomplishing the desired result; and such objects, advantages and capabilities will be readily apparent and better understood from the following description and claims taken in conjunction with the accompanying drawing, in which:

Figure 1:
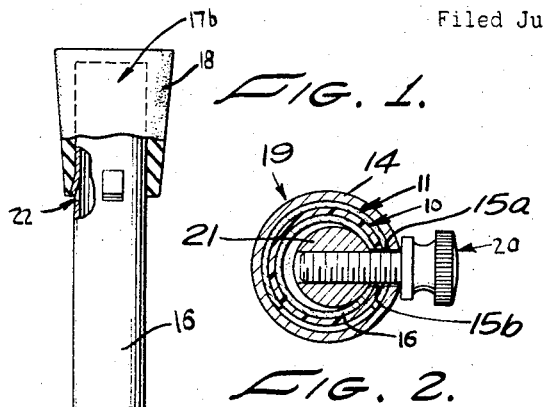
FIGURE 1 is a perspective view of the preferred embodiment of the present invention.

In the preferred embodiment of the invention, and with reference to the drawing in detail, a hollow, transparent plastic tube is shown in FIGURE 1, and has an aluminum jacket 11 adapted to fit over said tube 10 exactly along the length thereof. A standard scale 12 is engraved on and along the length of said jacket 11, and adjacent said scale 12 are two vertical and parallel rows of slots 13, which are also provided along the length of said jacket 11. The slots 13 are alternately provided on said jacket 11, so that a slot 13 is always present on said jacket 11 at any height along the length of said jacket 11. The said jacket 11 does not surround the outer surface of said tube 10 completely, but only approximately 75% of the circumferential area of said tube 10 is covered thereby. As a result, it is possible to see horizontally entirely through said tube 10 by sighting through any one of said slots 13 and the portion of said tube 10 which is not covered by said jacket 11. As a result, the height of any liquid within said tube 10 may be directly observed any place along said tube 10.

The top portion of said jacket 11 is adapted to have placed thereon a cylindrically shaped bearing ring 14 having hole means 15 thereon, for purposes hereinafter discussed. However, it should be noted that similar hole means 15a and 15b are similarly provided at the tops of said jacket 11 and tube 10, respectively. A hollow, circularly-shaped extension handle 16, also made of aluminum or similar material, is adapted to be slidingly inserted within said tube 10. The circumference of said handle 16 is truncated along one side thereof, so that it has the appearance of an elongated arc. The inner and outer ends, 17a and 17b respectively, of said handle 16 are notched inwardly for the purpose hereinafter discussed. In any event, a rubber knob 18 is provided at the outer end 17b of said handle 16 so as to assist the user thereof in grasping said handle 16.

Figure 2:
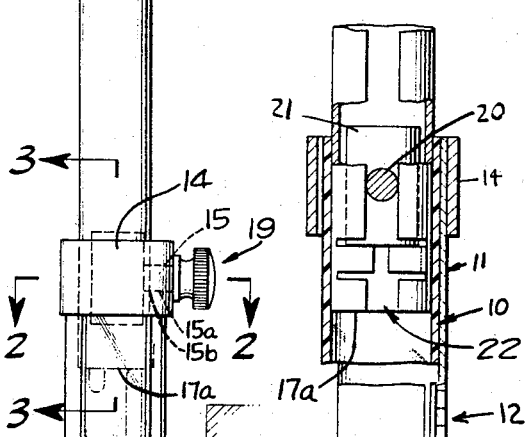
FIGURE 2 is a horizontal cross-sectional view taken along line 2—2 of FIGURE 1.

Means 19 for locking said handle 16 in proper position include a thumb screw 20 adapted to be inserted through hole means 15 and holes 15a and 15b, and held by thread means provided within a solid cylindrically shaped bearing member 21. Said member 21 fits longitudinally along the axis of said tube 10, and is small enough in diameter so as to also fit within the inner circumference of said handle 16. As a result, once the handle 16 is adjusted to its proper position, the thumb screw 20 is tightened so that said bearing member 21 is forced strongly towards one side of said handle 16, tube 10, jacket 11 and bearing ring 14, until it is not possible for said handle 16 to slide freely within said tube 10. As may be appreciated by viewing FIGURE 2 of the drawing, the channel created by the truncated circumference of said handle 16 receives said thumb screw 20 at any position along the length thereof. Further, the extension handle 16 is restricted in movement within said tube 10 to the distance established by said notched metal 22 because of same eventually coming in contact with said bearing member 21.

Figure 4:
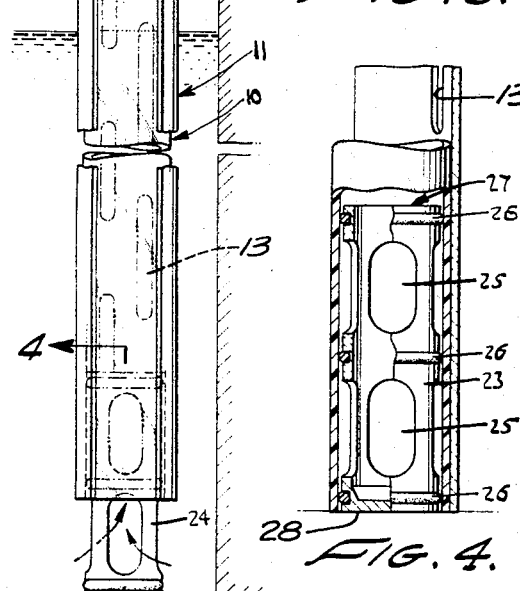
FIGURE 4 is a vertical cross-sectional view taken along line 4—4 of FIGURE 1 and illustrating the unique valve device of the invention.

As may be seen in FIGURE 4 of the drawing, unique valve means 23 are slidingly inserted within, and provided at the lowermost portion of said tube 10 and comprise a hollow cylindrically shaped member 24 having large oval shaped holes 25 provided along the sides thereof, and is closed at the tank bottom engaging end 28 thereof. Said member 24 is made preferably of aluminum or some other metal alloy resistant to the corrosive nature of the particular liquid or liquids stored within tanks, drums or similar containers. Three O-rings 26 are provided about the circumference of said member 24 in the manner shown in FIGURE 4, and said O-rings 26 insure a tight, non-leaking fit of said valve member 24 within said tube 10. As seen in FIGURE 1 of the drawing, when said valve means 23 are in an open position, liquid may flow inwardly or outwardly of said tube 10 through said holes 25, depending upon the height of the liquid pool surrounding said tube 10. Further, in actual operation, the inner end 17a of said handle 16 would normally be in bearing engagement with the top open end 27 of said member 24. When it is desired that said valve means 23 be closed relative to said tube 10, i.e., completely inserted within said tube 10, the user merely pushes down on said handle 16, while the same is locked and substantially in the position shown in FIGURE 1 of the drawing, while the closed end 28 of said member 24 is in contact with the bottom of said tank, so that said means 23 moves upwardly into the lowermost portion of said tube 10 (as seen in FIGURE 4). To open said valve means 23 relative to said tube 10, the locking means 19 are loosened until the inner end 17a of said handle 16 comes in contact with the top end 27 of said member 24, and the user then merely pushes down on said loosened handle 16 until said valve means 23 slide downwardly within said tube 10 to the position shown in FIGURE 1 of the drawing. As may thus be appreciated, the length of said handle is important and must be sufficiently long so as to enable it to actuate the said valve means 23 as aforesaid, but not too long so as to push said valve means 23 entirely out of said tube 10.

Figure 5:
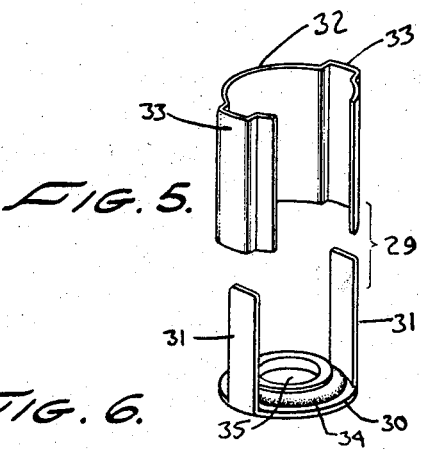
FIGURE 5 is another embodiment of a valve member utilized in the manner shown by FIGURE 6 of the drawing.
Figure 6:
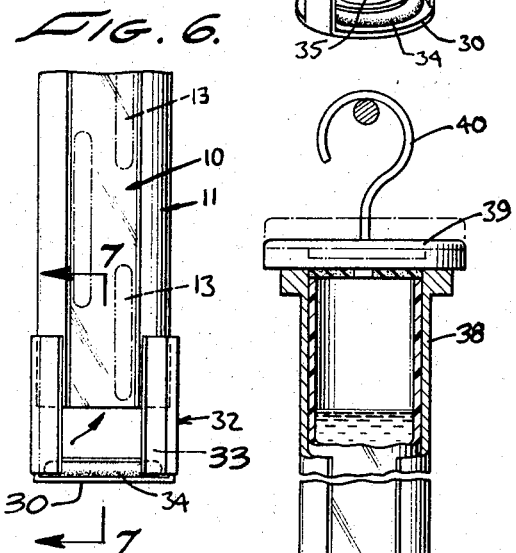
FIGURE 6 is a perspective view of another embodiment of the invention.
Figure 3:
FIGURE 3 is a vertical cross-sectional view taken along line 3—3 of FIGURE 1.
Figure 7:
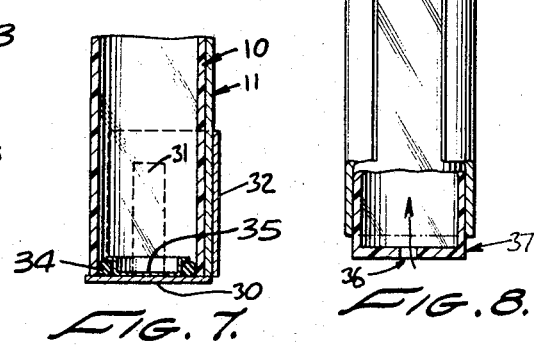
FIGURE 7 is a vertical cross-sectional view taken along line 7—7 of FIGURE 6.

Another embodiment of the invention is shown by FIGURES 5, 6 and 7 of the drawings. Said embodiment is utilized primarily in connection with acidic pools of liquid, with the tube 10 being made of glass or a similar substance and the metal of valve means 29 being made of stainless steel or a similar alloy. The valve means 29 thereof comprise a flat circularly shaped member 30 having two prongs 31 diametrically opposite each other, and a thin housing member 32 with two channels 33 provided therein opposite each other so as to receive said prongs 31. When said valve means 29 are connected in the manner shown by FIGURE 5 of the drawing, a substantial opening is provided along the side of said housing 32 so that liquid may flow inwardly or outwardly of same. An O-ring 34 is provided on the inner surface 35 of said member 30 so as to insure tight fit and engagement with the tube 10. Said valve means 29 are slidingly inserted over said tube 10, and is also actuated by handle 16, except that said handle 16 must be longer than in the preferred embodiment, but not too long so as to push said valve means 29 entirely out of engagement with said tube 10.

Figure 8:
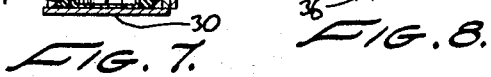
FIGURE 8 is a vertical cross-sectional view of still another embodiment of the present invention.

Another embodiment of the invention is shown by FIGURE 8 of the drawing. Small hole means 36 are provided at the bottom of modified, hollow tube means 37, also having a metal jacket 11 along the length thereof, except that said jacket 11 terminates at the upper portion thereof into a sleeve 38 made of a ferrous alloy. A flat cover 38, made of a magnetic material, is adapted to fit over the top of said tube 10 and to be retained in a closure position by magnetic attraction to said sleeve 38. Once liquid enters said hole means 36 into the tube 10, and the cover 39 is placed over said tube 10, the liquid will not run out of said tube 10. Hook means 40 may be provided on said cover 39 for the purpose of storing the liquid contained within said tube 10.

In operation, the invention is slowly inserted within a pool of liquid stored in a container, with the valve member in open position. When the closed end 28 of the valve contacts the bottom of the container, the valve is closed. The height of the liquid within said tube 10 will then be exactly the same as that of the liquid within said container. Further, the relative amounts of the various liquids comprising said pool may be easily determined.

While only a few embodiments of the present invention have been described and shown, said present invention is not intended to be restricted to any particular construction or arrangement, or to the specific embodiments disclosed herein, or any specific method of operation or use, since the same may be modified in various particulars.

I claim:

1. A device for indicating the height of a body of liquid, including the quantity of each of the fluids composing said body, said device comprising a hollow, transparent tube; a jacket adapted to fit over said tube along the length thereof but covering only a substantial portion of the circumferential area of said tube, said jacket having two parallel rows of alternatings slots with a scale therebetween along the length thereof; extension handle means adapted to slide within said tube and actuate valve means; locking means on said jacket adapted to selectively restrict the motion of said handle; and valve means in engagement with the lowermost portion of said tube and adapted to be actuated by said handle to its liquid-intake position and by exterior floor means to its liquid-retention or closed position.

2. A device as described in claim 1 above, whereby said valve means comprise a hollow cylindrically shaped member having a closed end for engagement with exterior floor means and elongated holes provided along the sides thereof so that the bottom of said tube may be easily viewed and liquid may easily flow therein and thereout, which valve means are adapted to be removably and slidingly inserted within the lowermost portion of said tube, and means adapted to prevent liquid from flowing out of said tube when said valve means are completely inserted therein.

3. A device as described in claim 1 above, whereby said valve means comprise a substantially cylindrically shaped hollow member having an arcuate side and a closed circular end, which valve means are adapted to be removably and slidingly inserted over the lowermost portion of said jacket.

4. A device for indicating the height of a body of liquid, including the quantity of each of the fluids composing said body, said device comprising a hollow transparent tube having small hole means provided at one end thereof; a jacket adapted to fit over said tube, with the upper portion thereof terminating as a sleeve made of a ferrous alloy; top closure means made of a magnetic material adapted to be magnetically attracted to said sleeve so as to seal the top of said tube; and hook means connected to said top closure means so that said device may be suspended.

References Cited

UNITED STATES PATENTS

| | | |
|---|---|---|
| 896,761 | 8/1908 | Rutenber. |
| 1,606,104 | 11/1926 | Schlueter et al. |
| 1,769,533 | 7/1930 | Nash et al. |
| 1,950,854 | 3/1934 | Lerch. |
| 2,067,795 | 1/1937 | Skuret et al. |
| 2,707,833 | 5/1955 | Parrott. |

WILLIAM D. MARTIN, Jr., *Primary Examiner.*

U.S. Cl. X.R.

73—425.4